United States Patent Office 3,476,146
Patented Nov. 4, 1969

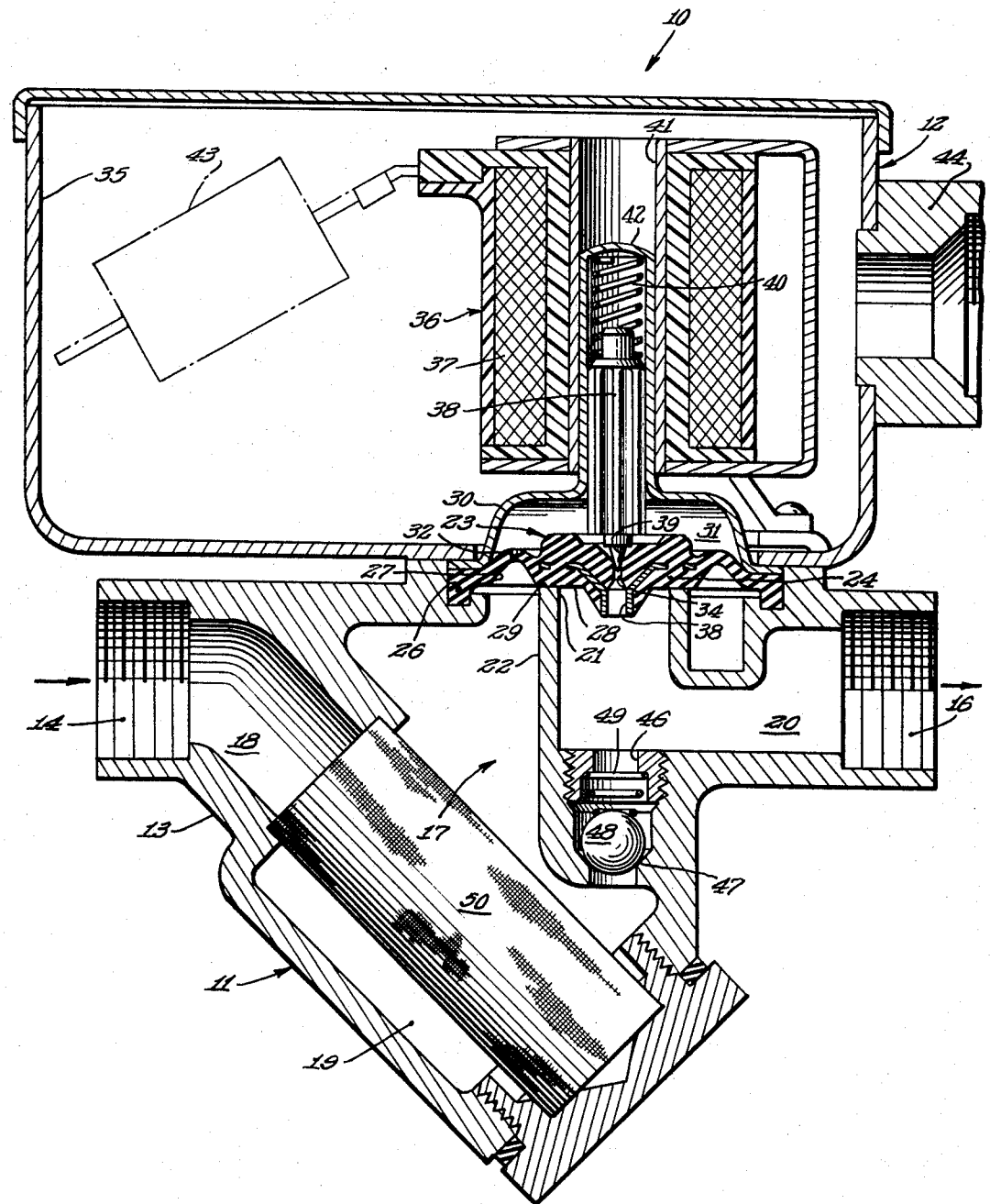

3,476,146
ANTI-KNOCK FLOW VALVE
Paul A. Dolter, Roselle, Ill., assignor to The Dole Valve Company, Morton Grove, Ill., a corporation of Illinois
Filed Feb. 10, 1967, Ser. No. 615,160
Int. Cl. F17d 3/00; F16k 31/08, 17/04
U.S. Cl. 137—599
2 Claims

ABSTRACT OF THE DISCLOSURE

For use with a liquid-carrying conduit, an apparatus for eliminating "water hammer" due to the formation of high intensity pressure shock waves when the flow of the liquid is rapidly stopped.

A relief valve comprising a spring-loaded ball check is connected to the conduit for momentarily relieving the instantaneous high pressure of the liquid which occurs upon rapid flow stoppage.

A fast-acting solenoid operated shut-off valve which includes such a relief valve.

BACKGROUND OF THE INVENTION

Water hammer is a commonly experienced phenomenon which occurs when the flow of a liquid in a conduit is stopped rapidly by means, for example, of a fast-acting solenoid operated shut-off valve. The hammer sounding knock results from a high intensity pressure shock wave which occurs at the point of flow stoppage. In a shut-off valve the shock wave occurs at the valve member as it closes the valve port.

Not only is the occurrence of water hammer in piping often a source of consternation and annoyance as, for example, in hot water heating systems, but often it may be injurious to the piping, valving, etc., and ought to be avoided, if possible.

SUMMARY OF THE INVENTION

Viewed broadly, the present invention comprises a method and apparatus for momentarily relieving the pressure of a liquid circulating in a conduit upon a rapid stoppage of the flow of the liquid to lower the pressure of the liquid to a safe level and to eliminate high intensity shock waves and water hammer.

In a more specific sense the invention involves an anti-knock valve comprising a valve housing having an inlet, an outlet and a flow passageway communicating said inlet and said outlet, means forming a port in said passageway, the valve member movable to open and close the port for controlling flow through the passageway and a relief valve communicating with said passageway for relieving excessive pressure therein due to the formation of a high intensity shock wave upon rapid closing of the port.

Although the present invention finds utility in any liquid valving system a particularly useful application is made to fast-acting, solenoid operated shut-off valves of the type commonly used, for example, in fan-coil units of hot water heating systems. In the application of any such valves the flow of water through the piping is stopped almost instantaneously upon actuation of the valve. This rapid flow stoppage causes the high intensity pressure shock wave.

The intensity of the shock wave depends upon several factors, such as the flow rate of the liquid, the diameter and length of the piping upstream of the valve, the particular type of liquid flowing through the piping and the physical material by which the piping is constituted. In any event, upon substantially instantaneous stoppage of the flow the liquid pressure immediately upstream of the valve increases by many times its normal value. This causes the high intensity shock wave which in turn accounts for the noticeable knock or "water hammer."

By means of the present invention, the pressure of the liquid upstream of the valve is momentarily relieved by allowing a small measure of the liquid to bleed from the upstream side of the valve. This momentary bleeding lowers the intensity of the shock waves to a safe level and eliminates the undesirable noise and injurious effects associated with water hammer.

In one embodiment of the invention, the relief or bleeding means comprises a check valve having a spring loaded ball check. When the pressure of the liquid on the upstream side of the shut-off valve rises to a predetermined value the ball check opens against the spring to momentarily bleed liquid and reduce the pressure. As the liquid pressure decreases the ball check is reseated by the spring to prevent further bleeding.

It is, therefore, an object of the present invention to provide a method and apparatus for eliminating water hammer in a liquid-carrying conduit resulting from rapid stoppage of the flow of the liquid.

Another object is to eliminate the hammer-sounding noise and injurious effects associated with this phenomenon.

Another object is to provide the liquid-carrying conduit with a relief valve so situated as to momentarily open to bleed liquid from the conduit to avoid the build-up of excessive pressure in the liquid.

Another object is to provide a fast-acting solenoid operated shut-off valve with pressure relief means to avoid water hammer upon closing of the valve.

With respect to this last object, one feature of the invention comprises the provision of a bleed passageway in the valve housing communicating the flow passageway in the valve on the upstream side of the valve member with the flow passageway on the downstream side of the valve member, and a spring-loaded ball check in the bleed passageway to function as a relief valve.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWING

The figure is a cross-sectional view of a fast-acting solenoid operated shut-off valve constructed in accordance with the principles of the present invention.

DESCRIPTION OF THE PREFERRED EMBODIMENT

In the drawing reference numeral 10 indicates generally a fast-acting solenoid operated shut-off valve, a common application of which is found in hot water heating systems utilizing fan-coil units in which the solenoid valves are utilized to control the flow of hot water through the fan coil units.

The valve 10 comprises a lower portion 11 through which the water circulates and an upper portion 12 which comprises the electrical components of the valve.

The lower portion 11 is more particularly characterized as comprising a housing 13 having formed therein an inlet 14, an outlet 16 and a liquid flow passageway 17 communicating the inlet 14, an outlet 16. The flow passageway 17 further comprises an inlet passageway 18, an upstream chamber 19 and a downstream chamber 20. The terms "upstream" and "downstream" designate the relative dispositions of the chambers 19 and 20 with respect to a port 21 formed in a sleeve 22 through which all of the liquid must pass as it flows from the inlet 14 to the outlet 16.

A valve member indicated generally at reference numeral 23 is provided to open and close the port 21. The valve member 23 is generally of the diaphragm-type and comprises a central portion 24, a peripheral bead 26 and an interconnecting web portion 27. The bead 26 is securely clamped in the housing 13 and the central portion 24 is movable axially because of the flexibility of the web 27. A radial wall 28 of the central portion 24 is movable into and out of abutting engagement with a valve seat 29 and causing the port 21 to open and close the port.

The back side of the valve member 23 is enclosed in a shroud 30 to provide a back chamber 31. An aperture 32 is formed in the web portion 27 of the valve member to enable liquid on the upstream side of the valve member to flow into and pressurize the back chamber 31. Another aperture 34 is formed in the central portion 24 of the valve member and is larger in cross-sectional area than is the aperture 32.

Situated within a housing 35 of the valve upper portion 12 is a solenoid 36 comprising a winding component 37 and a slug or armature 38. The lower end of the slug 38 is tapered as at 39 to close the restricted orifice 34 when biased downwardly by the action of a coil spring 40 within a bore 41 and bottoming at one end on the slug 38 and at the other end on a slug housing 42.

A rectifier indicated schematically at 43 may also be housed within the valve upper portion 12 and a connector 44 is provided to receive the end of the wire carrying conduit connected to the valve 10.

In operation the slug 38 is urged downwardly by the spring 40 when the windings 37 are deenergized, thus closing the restricted orifice 34. When the windings 37 are energized the slug 38 is pulled upwardly against the bias of the spring 40 and the orifice 34 is opened.

When the orifice 34 is closed liquid from the chamber 19 passes through the aperture 32 into the back chamber 31. Eventually the pressure in the back chamber 31 equals the pressure in chamber 19. Thus almost the entire back side of the valve member 23 is subjected to the pressurized liquid.

On the front side of the valve member 23, however, only the peripheral portion surrounding the port 21 is subjected to the higher pressure. Because of this imbalance the valve member is positively biased to a closed position.

When the slug 38 is moved upwardly, however, to open orifice 34 the pressure in chamber 31 is relieved. Since flow through the aperture 32 is necessarily less than flow through the orifice 34, the pressure of the fluid on the front side of the valve member immediately urges the valve member 23 upwardly to an open position to establish flow through the valve 10.

Because of the rapidity with which the valve member 23 moves to open and close the port 21 upon energization and deenergization of the solenoid 36 the valve 10 may be referred to as a "fast-acting" valve, particularly susceptible to the effects of water hammer.

In order to eliminate this water hammer effect and in accordance with the principles of this invention a bleed passageway or bore 46 is formed in the lower housing 13 to communicate chambers 19 and 20 situated respectively on the upstream and downstream sides of thhe port 21. The bore 46 narrows at 47 to form a port, on one side of which is located a ball check 48 urged toward the port 47 by means of a spring 49.

The ball check 48 and the spring 49 comprise together a relief or bleed valve which enables fluid from the chamber 19 to bypass the port 21 and flow directly into the chamber 20.

As a result of the check valve, when the valve member 23 rapidly closes the port 21 the high intensity pressure shock wave normally attendant to such rapid closing is relieved through the bleed valve and water hammer is eliminated. The spring 49 is selected to provide a closing bias to the ball check 48 which exceeds the static pressure of the liquid in chamber 19, and thus closes the port 47 to prevent further bleeding as soon as the abnormally high pressure in the chamber 19 due to the shock wave is reduced to a safe level.

A filter or screen 50 may be provided within the chamber 19 to remove foreign particles from the liquid which may have a deleterious effect on the normal opening and closing of the valve member 23 and the ball check 48.

Although minor modifications might be suggested by those versed in the art, it should be understood that I wish to embody within the scope of the patent warranted hereon all such modifications as reasonably come within the scope of my contribution to the art.

I claim as my invention:

1. An anti-knock valve comprising
   a valve housing having wall means forming an inlet,
   an outlet and a flow passageway communicating said inlet and said outlet,
   means forming a port in said flow passageway,
   valve means in said flow passageway including a flexible diaphragm valve member having first and second opposite sides and extending across said port,
      said first side being engageable with said port forming means for opening and closing said port and said second side forming with said wall means a closed back chamber,
      said first aperture means communicating said back chamber and said flow passageway on the upstream side of said port and said second aperture means communicating said back chamber and said flow passageway on the downstream side of said port,
      said second side of said valve member having a greater effective area exposed to inlet pressure in the closed position thereof than said first side thereof,
   means for selectively opening said second aperture means to dump said back chamber to quickly open said valve member and for closing said second aperture means to cause pressurization of said back chamber to quickly close said valve member,
   means forming a by-pass passageway communicating the flow passageway on the upstream side of said port with the flow passageway on the downstream side of said port, and
   relief valve means in said by-pass passageway for relieving excessive pressure therein and on the upstream side of said flow passageway due to high intensity shocked waves which may develop upon the rapid closing of said valve member.

2. The anti-knock valve as defined in claim 1 wherein said means for selectively opening and closing said second aperture means comprises a fast-acting solenoid and wherein said relief valve means comprises a resiliently biased ball check.

References Cited

UNITED STATES PATENTS 2,187,789  1/1940  Lanz _____ 137—599 X
2,936,780  5/1960  Pratt _____ 251—30 X ALAN COHAN, Primary Examiner HOWARD M. COHN, Assistant Examiner U.S. Cl. X.R.

251—30